April 14, 1925.
A. V. VERVILLE
AIRCRAFT FUSELAGE
Filed April 18, 1922
1,533,285
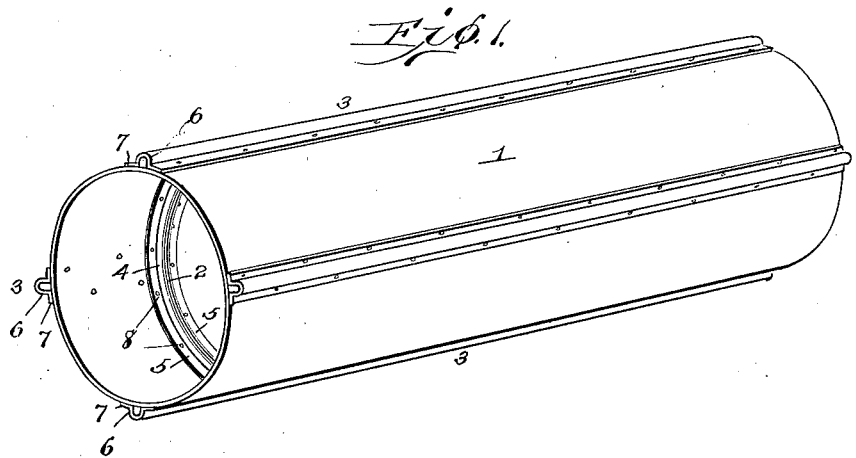
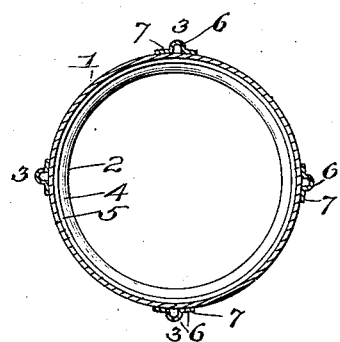 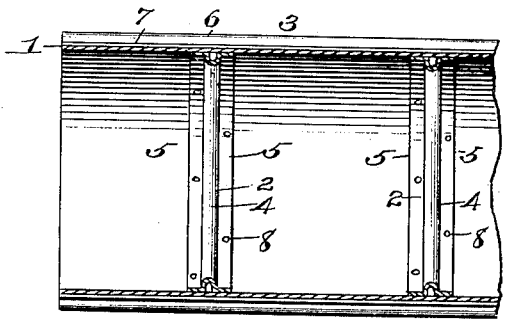
Inventor
A. V. Verville
By Robert H. Young
Attorney Patented Apr. 14, 1925.

1,533,285

UNITED STATES PATENT OFFICE.

ALFRED V. VERVILLE, OF DAYTON, OHIO.

AIRCRAFT FUSELAGE.

Application filed April 18, 1922. Serial No. 555,308.

*To all whom it may concern:*

Be it known that I, ALFRED V. VERVILLE, a citizen of the United States, residing at Dayton, in the county of Montgomery and State of Ohio, have invented certain new and useful Improvements in Aircraft Fuselages, of which the following is a specification.

This invention relates to aircraft construction and particularly to the construction of the fuselage, body, nacelle or hull of such craft.

The object of the invention is to produce a light weight and yet strong body structure of streamline formation having a maximum carrying capacity, and eliminating the usual expensive and time consuming internal bracing and trussing.

A further object of the invention is to produce a body of the character referred to which is well adapted to rapid and accurate quantity production.

With the above and other objects in view the invention is more fully described in the following specification in connection with the accompanying drawings.

In the drawings:

Figure 1 is a fragmentary perspective view of a fuselage embodying the invention;

Figure 2 is a cross section through the fuselage; and

Figure 3 is a fragmentary longitudinal section thereof.

In the construction of a fuselage embodying the present invention three main elements enter into the structure, viz: a thin shell like body 1, hoops 2 arranged internally of said body, and ribs 3 extending longitudinally of the outside of the body.

The shell like body 1 may be composed of one or more sheets of plywood, fiber board, bakelite, micarta, aluminum, steel or any suitable sheet material. The body is usually of streamline formation to cut down head resistance.

The internal hoops 2 may be of sheet steel, duralumin or any light strong metal and may be given various shapes in cross section. As shown, each hoop is circular and in cross section comprising a central hollow, channeled or U-shaped portion 4 and flanges 5 at opposite sides thereof.

The outside ribs 3 may be made of the same material and shape in cross section as the hoops 2. Each rib 3 is shown as comprising a hollow, channeled or U-shaped central portion 6 and flanges 7 at opposite sides thereof. The ribs 3 extend longitudinally of the fuselage and where they cross the hoops 2, fasteners 8 such as rivets pierce the flanges of the ribs 3 and hoops 2 and pass through the body 1. In this manner all parts of the fuselage structure are firmly fastened together, while all ordinary internal bracing elements such as struts, wires and gusset plates are eliminated The result is a lighter and stronger fuselage adapted to rapid and accurate quantity production. The invention is adapted to any aircraft body, nacelle, hull or the like of closed shell like construction.

What I claim is:

1. An aircraft body structure comprising a shell of streamline formation, flanged metal hoops stationed at intervals in said shell in contact with the inner face thereof, and flanged metal ribs extending longitudinally of and in contact with the outer surface of said shell.

2. An aircraft body structure comprising a shell of streamline formation, flanged metal hoops stationed at intervals in said shell in contact with the inner face thereof, and flanged metal ribs extending longitudinally of and in contact with the outer surface of said shell, said flanged inside and outside members being riveted together.

3. An aircraft body structure comprising a shell of streamline formation, flanged metal hoops stationed at intervals in said shell in contact with the inner face thereof, and flanged metal ribs extending longitudinally of and in contact with the outer surface of said shell, the flanges of said hoops and ribs being secured to each other by fasteners.

4. An aircraft body structure comprising a shell of streamline formation, flanged U-shaped metal hoops stationed at intervals in said shell in contact with the inner face thereof, and flanged U-shaped metal ribs extending longitudinally of and in contact with the outer surface of said shell.

5. In aircraft construction, a thin closed shell like body of streamline formation, hoops stationed at intervals therein, ribs extending longitudinally of the outer surface of said body, and fasteners piercing said hoops, ribs and body at points where the hoops and ribs cross each other.

In testimony whereof I affix my signature.

ALFRED V. VERVILLE.